(12) United States Patent
Okada

(10) Patent No.: US 10,371,602 B2
(45) Date of Patent: Aug. 6, 2019

(54) TIRE TESTING RIM

(71) Applicant: KOBE STEEL, LTD., Hyogo (JP)

(72) Inventor: Toru Okada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 88 days.

(21) Appl. No.: 15/548,889

(22) PCT Filed: Jan. 15, 2016

(86) PCT No.: PCT/JP2016/051123
§ 371 (c)(1),
(2) Date: Aug. 4, 2017

(87) PCT Pub. No.: WO2016/129325
PCT Pub. Date: Aug. 18, 2016

(65) Prior Publication Data
US 2018/0024027 A1    Jan. 25, 2018

(30) Foreign Application Priority Data
Feb. 9, 2015 (JP) ................................. 2015-023278

(51) Int. Cl.
*G01M 17/02* (2006.01)
(52) U.S. Cl.
CPC ................ *G01M 17/021* (2013.01)
(58) Field of Classification Search
CPC .................................. G01M 17/021
USPC ......................................... 73/146
See application file for complete search history.

(56) References Cited

U.S. PATENT DOCUMENTS

| 2,986,182 A | | 5/1961 | Roesch | |
|---|---|---|---|---|
| 4,401,144 A | * | 8/1983 | Wilde | B60C 17/04 152/158 |
| 4,574,628 A | * | 3/1986 | Maikuma | G01M 17/021 73/146 |
| 4,768,573 A | * | 9/1988 | Poque | B60C 15/02 152/378 R |
| 4,971,128 A | * | 11/1990 | Koga | B29D 30/0662 127/21 |

(Continued)

FOREIGN PATENT DOCUMENTS

| DE | 69509969 | * | 7/1999 | .......... G01M 17/021 |
|---|---|---|---|---|
| DE | 695 09 969 T2 | | 9/1999 | |

(Continued)

OTHER PUBLICATIONS

JIS B 0601(1994),3541-3542, Excerpts from JISB0031(1994).*

(Continued)

*Primary Examiner* — Marrit Eyassu
(74) *Attorney, Agent, or Firm* — Studebaker & Brackett PC

(57) ABSTRACT

A rim for tire testing includes a rim body that is rotatably provided in a tire testing device so that a tire to be tested can be attached to the rim body, and a filling unit that can fill the tire to be attached to the rim body with a gas at a predetermined pressure. The rim body can be divided into a plurality of members in a direction along a rotational axis of the rim body. Of the rim body divided into the plurality of members, a rim base portion to be contact with a tire bead portion of the tire is integrated with the other divided members than the rim base portion by use of a coupling member.

4 Claims, 5 Drawing Sheets

(56) References Cited

U.S. PATENT DOCUMENTS

| | | | | |
|---|---|---|---|---|
| 5,257,561 | A * | 11/1993 | Folta | G01M 17/021 |
| | | | | 157/14 |
| 6,308,566 | B1 * | 10/2001 | Matsumoto | G01M 1/045 |
| | | | | 73/146 |
| 8,770,251 | B2 * | 7/2014 | De Graaf | B29D 30/32 |
| | | | | 156/402 |
| 9,464,964 | B2 * | 10/2016 | Miyazaki | G01M 17/021 |
| 2013/0334754 | A1 * | 12/2013 | Wakazono | G01M 17/021 |
| | | | | 269/55 |

FOREIGN PATENT DOCUMENTS

| | | |
|---|---|---|
| JP | S55-123511 A | 9/1980 |
| JP | H05-187952 A | 7/1993 |
| JP | 2005-014652 A | 1/2005 |
| JP | 2012-181153 A | 9/2012 |

OTHER PUBLICATIONS

International Search Report issued in PCT/JP2016/051123; dated Mar. 8, 2016.
Written Opinion issued in PCT/JP2016/051123; dated Mar. 8, 2016.
The extended European search report issued by the European Patent Office dated Sep. 3, 2018, which corresponds to European Patent Application No. 16748970.7-1001 and is related to U.S. Appl. No. 51/548,889.

* cited by examiner

TIRE TESTING RIM

TECHNICAL FIELD

The present invention relates to a rim for tire testing, the rim being provided in a tire testing device for measuring uniformity etc. of a tire.

BACKGROUND ART

Hitherto, a tire test (tire uniformity test) has been performed on a product tire manufactured in a tire manufacturing line. The tire uniformity test measures tire uniformity (evenness) etc. of the tire and determines whether the tire is good or not.

A tire uniformity machine (tire testing device) for performing the tire uniformity test has a configuration in which a predetermined load is applied to a rim-fitted tire to press the tire onto a rotary drum, and a distance between a spindle shaft and a drum shaft is fixed, and then, the tire is rotated so that a force variation generated in the tire can be measured (for example, see Patent Literature 1). The tire uniformity machine measures a load variation (RFV: Radial Force Variation) in a direction in which the load is applied to the tire, a static load deviation (CON: Conicity) in a width direction of the tire, a load variation (LFV: Lateral Force Variation) in the width direction of the tire, etc.

A rim provided in the tire testing device, that is, a rim for tire testing for fixing a tire to be tested has a structure in which the rim can be divided vertically into two, that is, an upper rim and a lower rim, by which the tire can be mounted surely in a short time. For example, when the tire is conveyed into the testing device by a conveyor, of the upper and lower rims which have been held vertically separately from each other, the upper rim moves down from above and the lower rim moves up from below at the same time as the tire is conveyed into the testing device. Then, the upper and lower rims move to put the tire therebetween from above and from below respectively. Thus, the tire can be attached to the rim for tire testing.

The rim for tire testing is made of steel or SUS and designed to be thick. The rim for tire testing has a structure in which the rim for tire testing has rigidity high enough to withstand the internal pressure of the tire. In addition, the rim for tire testing is formed so as to satisfy roundness high enough to reduce deflection during rotation. Thus, the tire uniformity can be measured with high accuracy. Further, when the rim for tire testing is made of steel, plating for preventing rust or abrasion may be performed on a surface of the rim for tire testing.

To the rim for tire testing formed thus, the tire to be tested is fixed in contact with the rim for tire testing at two points, that is, a vertically central portion (a rim base portion in the present invention) of a rim body and an upper end portion (a rim flange portion in the present invention) of the rim body. More specifically, the rim base portion is contact with an inner peripheral surface of a tire bead portion so as to position (center) the horizontal position of the tire at the center of the testing device. In addition, in order to support the radial load of the tire, the rim base portion is attached to the tire in an interference fitting manner with no space between the rim base portion and the tire bead portion. Further, the outer diameter of the rim base portion is designed to be larger than the inner diameter of the tire, so that the tire can be pressed into the rim base portion by use of a load generated in the tire when the tire is filled with compressed air.

CITATION LIST

Patent Literature

Patent Literature 1: JP-A-2012-181153

SUMMARY OF THE INVENTION

Technical Problems

When the aforementioned tire to be tested is pressed into the rim base portion, a large frictional force is inevitably generated between the tire bead portion and the rim base. When the frictional force is too large, the tire may be insufficiently fitted to the rim for tire testing, or the tire may be fitted so that the tire cannot be removed from the rim for tire testing after the tire test is finished.

Therefore, in a method used in the background-art tire testing device, the tire bead portion is coated with lubricant such as silicone liquid in advance so as to reduce the frictional force generated between the tire bead portion and the rim for tire testing. However, there is a problem that the coating with the lubricant likely leads to corrosion of the rim for tire testing easily. In recent years, it has been considered as an alternative technique to perform a friction reduction treatment on the surface of the rim base.

In the friction reduction treatment, coating or a concave-convex structure by which the tire can slide on the surface of the rim for tire testing smoothly is formed in the surface of the rim for tire testing, it would be sufficient that the friction reduction treatment is performed on, of the rim for tire testing, only a part which would be contact with the tire to be tested. That is, it would be sufficient that the friction reduction treatment is performed on, of the rim for tire testing, only the rim base portion where the frictional force would increase. However, there is a problem that large-scale work is required for performing the friction reduction treatment. That is, it is necessary to remove the whole of the rim for tire testing from the testing device, and to attach the removed rim for tire testing to a processing machine for performing the friction reduction treatment thereon.

In addition, the surface hardness of a part subjected to the friction reduction treatment is lower than that of a part which has not been subjected to the friction reduction treatment. Thus, the part subjected to the friction reduction treatment may deteriorate easily due to abrasion or the like. As a result, the rim for tire testing subjected to the friction reduction treatment must be frequently replaced or reworked. Thus, there is a problem that workability is not good.

The present invention has been made in consideration of the aforementioned situation. An object of the present invention is to provide a rim for tire testing in which, of the rim for tire testing, only a rim base portion subjected to a friction reduction treatment can be removed easily so that a part subjected to the friction reduction treatment can be repaired or replaced easily and at a low cost.

Solution to Problems

In order to achieve the above object(s), the present invention provides the following technical means.

That is, the rim for tire testing in the present invention is a rim for tire testing, including a rim body that is rotatably provided in a tire testing device so that a tire to be tested can be attached to the rim body, and a filling unit that can fill the tire to be attached to the rim body with a gas at a predetermined pressure, wherein: the rim body can be divided into a plurality of members in a direction along a rotational axis of the rim body; and of the rim body divided into the plurality of members, a rim base portion to be contact with a tire bead portion of the tire is integrated with the other divided members than the rim base portion by use of a coupling member.

It is preferred that: the rim body should be divided into the rim base portion, a rim flange portion that is disposed on one side of the rim base portion and in the direction along the rotational axis, and a body portion that is disposed on the other side of the rim base portion and in the direction along the rotational axis; and the rim base portion, the rim flange portion and the body portion should be integrated by use of the coupling member.

It is preferred that a positioning mechanism that aligns a rotational axis of the rim base portion with rotational axes of the other divided members than the rim base portion should be provided between the rim base portion and the other divided members than the rim base portion.

It is preferred that an outer peripheral surface of the rim base portion has been subjected to a friction reduction treatment for reducing a frictional force to the tire.

It is preferred that the friction reduction treatment should include a concave-convex structure that is formed in the outer peripheral surface of the rim base portion, and a coating layer with which a surface of the concave-convex structure is coated.

It is preferred that a maximum roughness Ry of the concave-convex structure should be 10 μm or more.

Advantageous Effects of the Invention

In a rim for tire testing according to the present invention, only a rim base portion subjected to a friction reduction treatment can be removed easily so that a part subjected to the friction reduction treatment can be repaired or replaced easily and at a low cost.

MODE FOR CARRYING OUT THE INVENTION

An embodiment of the present invention will be described below with reference to the drawings.

Figure 1:
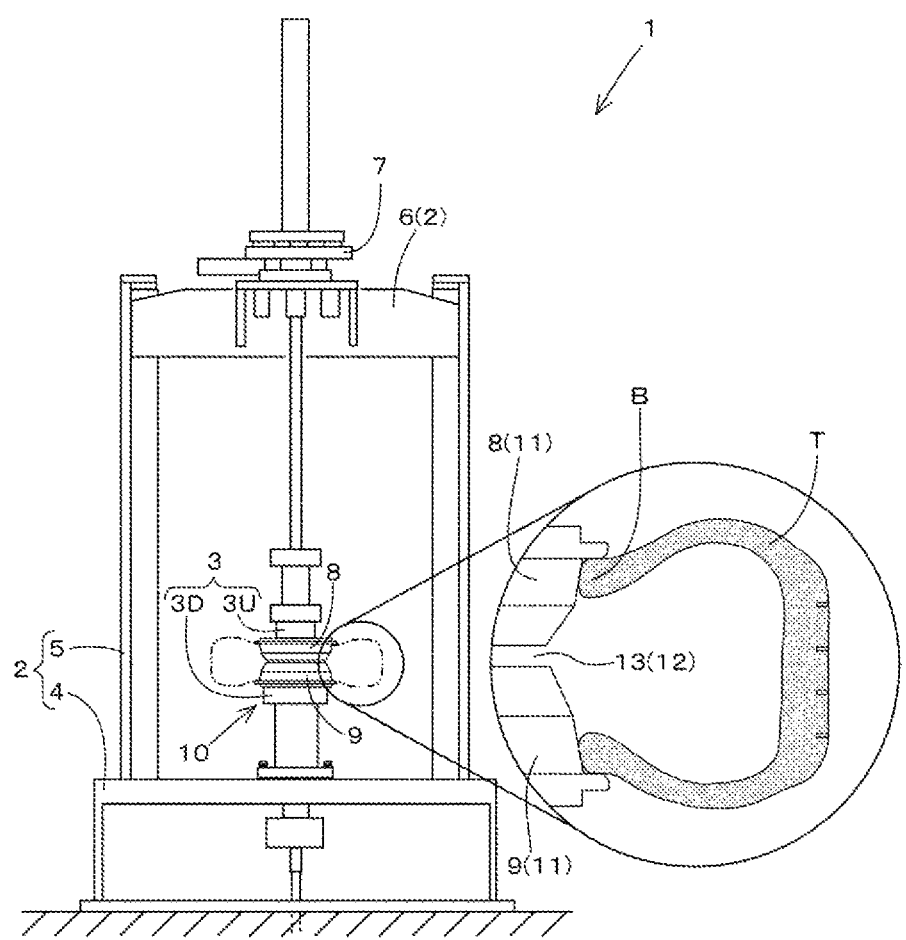
FIG. 1 A front view of a tire testing device to which a rim for tire testing according to the present invention has been attached.

FIG. 1 shows a tire testing device 1 according to the present embodiment.

As shown in FIG. 1, the tire testing device 1 according to the present embodiment has a frame member 2, and a spindle shaft 3. The spindle shaft 3 is supported by the frame member 2 so that a tire T to be tested can be removably attached to the spindle shaft 3. In addition, in this tire testing device 1, a rotary drum (not shown) is provided beside the spindle shaft 3 so that a simulation road surface formed on an outer peripheral surface of the rotary drum can be pressed onto the tire T attached to the spindle shaft 3.

The frame member 2 has a base portion 4 and a pair of left and right supports 5 and 5. The base portion 4 is formed into a substantially rectangular shape in front view, and mounted on a base. The pair of left and right supports 5 and 5 are provided erectly on the left end side and the right end side of the base portion 4. A beam portion 6 is provided at the upper ends of the pair of left and right supports 5 and 5 so as to extend in a left/right direction. In addition, a spindle mounting portion 7 for supporting the spindle shaft 3 is attached to a middle portion of the beam portion 6 in the left/right direction. The aforementioned spindle shaft 3 is disposed between the spindle mounting portion 7 and the base portion 4 so as to extend vertically.

The spindle shaft 3 is a rod-shaped member which is vertically long and disposed in a central portion in the left/right direction inside the frame member 2. The tire T to be tested is attached to the vertically middle side of the spindle shaft 3 so that the tire T can be held by the spindle shaft 3. In addition, the spindle shaft 3 is made rotatable around an axis extending vertically, so that the held tire T to be tested can be driven and rotated around the vertically extending axis.

Specifically, the spindle shaft 3 has a lower spindle shaft 3D and an upper spindle shaft 3U. The lower spindle shaft 3D is made rotatable around the vertically extending axis. The upper spindle shaft 3U is disposed above the lower spindle shaft 3D so that the upper spindle shaft 3U can move vertically relatively to the lower spindle shaft 3D. An upper rim 8 is provided on the lower end side of the upper spindle shaft 3U, and a lower rim 9 is provided on the upper end side of the lower spindle shaft 3D. A rim for tire testing 10 according to the present invention is constituted by the upper rim 8 and the lower rim 9.

The rim for tire testing 10 is a member which is disposed on the vertically middle side of the spindle shaft 3 so as to hold the tire T to be tested. The rim for tire testing 10 has a rim body 11 and a filling unit 12. The rim body 11 is attached to an outer peripheral surface of the spindle shaft 3 so that the tire T to be tested can be attached to the rim body 11. The filling unit 12 can fill the tire T to be attached to the rim body 11 with a gas at a predetermined pressure.

The rim body 11 includes the upper rim 8 and the lower rim 9, which can be separated from each other. Each of the upper rim 8 and the lower rim 9 constituting the rim body 11 is formed into a substantially disc shape and is made of a metal such as steel or SUS higher in strength than aluminum.

Figure 2A:
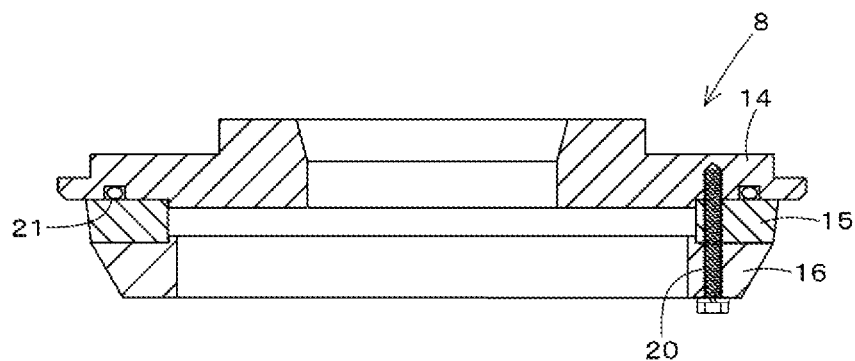
FIG. 2A A sectional view showing a sectional structure of an upper rim according to an embodiment of the present invention.
Figure 2B:
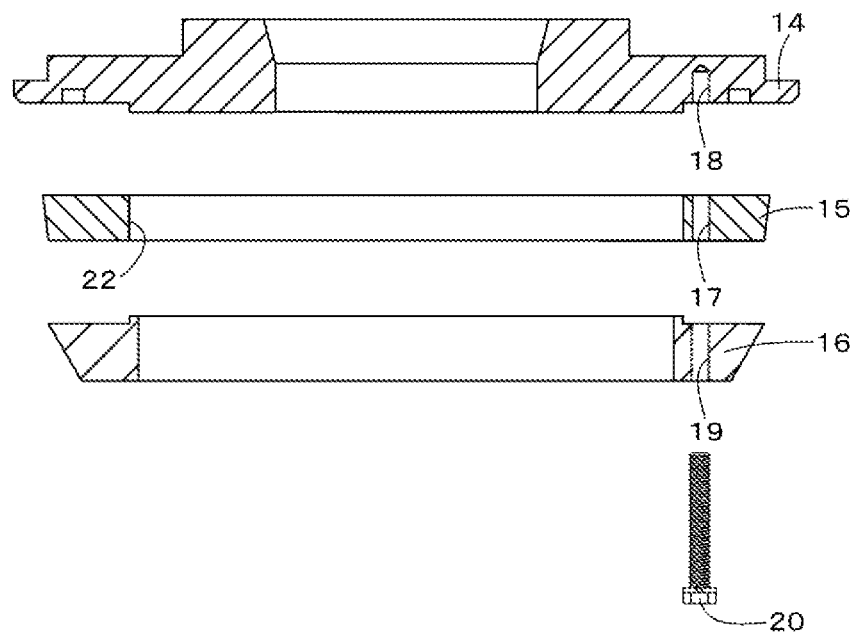
FIG. 2B An exploded view showing the upper rim according to the present embodiment, which is exploded vertically.

As shown in FIG. 2A and FIG. 2B, the lower end side of the upper rim 8 is formed into a tapered cylindrical shape whose diameter is reduced as goes downward, and the upper end side of the upper rim 8 is formed into a flange shape. The lower side of the tapered part in the upper rim 8 has a smaller outer diameter than the inner diameter of the tire T so that it can be inserted into a tire bead portion B on the central side of the tire from above. In addition, the flange-shaped protruding on the upper end side presses the tire bead portion B from above so that the tire T can be fixed (see the enlarged view of FIG. 1). The tire bead portion B will be described later.

Figure 3A:
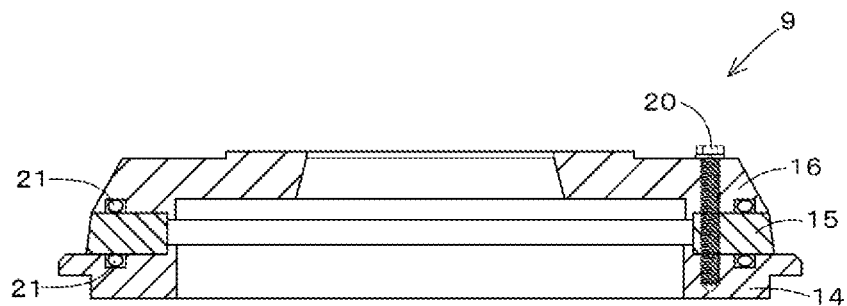
FIG. 3A A sectional view showing a sectional structure of a lower rim according to the present embodiment.
Figure 3B:
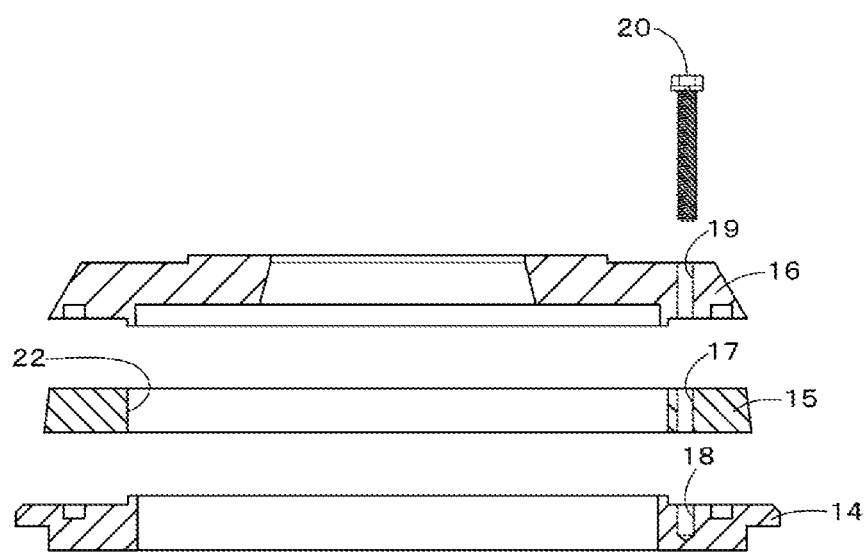
FIG. 3B An exploded view showing the lower rim according to the present embodiment, which is exploded vertically.

As shown in FIG. 3A and FIG. 3B, the lower rim 9 has a shape obtained by vertically inverting the aforementioned upper rim 8.

In addition, as shown in FIG. 1, a gap 13 is formed vertically between the upper rim 8 and the lower rim 9 so that the tire T can be filled with compressed air or nitrogen (gas) at a predetermined pressure through the gap 13. That is, a passage where compressed air or the like can circulate is formed inside the aforementioned spindle shaft 3. One end of the passage is connected to a gas supply source of compressed air or the like, such as a compressor or an accumulator, or a pressure adjustment valve which can adjust air pressure from the gas supply source. The other end of the passage is opened to an end portion of the spindle shaft 3 located on the further radially inner side of the gap 13, so that gas such as compressed air can be supplied from the gas supply source into the tire T. That is, the aforementioned gap 13 constitutes the filling unit 12 by which the tire T to be attached to the rim body 11 is filled with a gas such as compressed air at a predetermined pressure.

In the rim for tire testing 10 according to the present invention, the rim body 11 can be divided into a plurality of members vertically (in a direction along the rotational axis of the rim body 11). Of the rim body 11 divided into the plurality of members, a rim base portion 15 to be contact with the tire bead portion B is integrated with the other divided members than the rim base portion 15 by use of a coupling member 20. According to the present embodiment, the rim body 11 includes the upper rim 8 and the lower rim 9, and each of the upper rim 8 and the lower rim 9 can be vertically divided into three members.

More specifically, each of the upper rim 8 and the lower rim 9 is divided into a rim base portion 15, a rim flange portion 14 and a body portion 16. The rim flange portion 14 is disposed on one side (one side in a direction along the rotational axis) of the rim base portion 15, and the body portion 16 is disposed on the other side (the other side in the direction along the rotational axis) of the rim base portion 15. For example, in the case of the upper rim 8, the rim flange portion 14 is disposed above the rim base portion 15, and the body portion 16 is disposed under the rim base portion 15. In the case of the lower rim 9, the rim flange portion 14 is disposed under the rim base portion 15, and the body portion 16 is disposed above the rim base portion 15. Further, an outer peripheral surface of the rim base portion 15 is subjected to a friction reduction treatment for reducing frictional force to the tire T.

Next, as to the rim base portion 15, the rim flange portion 14 and the body portion 16, which constitute the rim for tire testing 10 according to the present embodiment, and the friction reduction treatment, the upper rim 8 will be mainly described.

Of the aforementioned rim body 11, the rim base portion 15 is a part formed at a place which will be contact with the tire bead portion B from its inner peripheral side. More specifically, the upper rim 8 of the rim body 11 can be divided into three members, that is, the rim flange portion 14, the rim base portion 15 and the body portion 16 vertically (in the direction along the rotational axis of the rim body 11) from the upper end side as described above. Of the members arranged thus vertically, the rim base portion 15 is a member located vertically in the middle. For example, in the case of the upper rim 8, the rim base portion 15 is disposed in a position adjacent to the lower side of the rim flange portion 14 and adjacent to the upper side of the body portion 16.

In addition, the rim base portion 15 is a so-called ring-shaped cylindrical member whose vertical length is shorter than its diameter. An outer peripheral surface rising steeply and substantially vertically is formed vertically on the outer peripheral side of the rim base portion 15. The outer peripheral surface of the rim base portion 15 has an outer diameter a little lager than the inner diameter of the tire T. The rim base portion 15 can be inserted (pressed) into the tire bead portion B so that the outer peripheral surface extending vertically can be contact with the inner peripheral surface of the tire bead portion B. Further the rim base portion 15 is formed into a tapered shape whose diameter is a little smaller on the lower end side than on the upper end side, so that the rim base portion 15 can be inserted into the inner peripheral side of the tire T easily.

A fastening hole 17 is formed in the aforementioned rim base portion 15 so as to penetrate the rim base portion 15 vertically. The fastening hole 17 is formed in the same radial position as fastening holes 18 and 19 (which will be described in detail later) formed in the rim flange portion 14 and the body portion 16 as will be described later. In addition, a female thread portion is formed in the fastening hole 17 so that a coupling member 20 such as a bolt can be screwed down thereto.

Further, a friction reduction treatment is performed on the outer peripheral surface of the rim base portion 15. Due to the friction reduction treatment, frictional force which is generated between the rim base portion 15 and the tire bead portion B can be reduced to make it easy to attach and remove the tire T to be tested. The friction reduction treatment will be described in detail later.

In the case of the upper rim 8, the rim flange portion 14 is a disc-shaped member disposed adjacently to the upper side of the aforementioned rim base portion 15, and the rim flange portion 14 has an outer diameter larger than the outer diameter of the rim base portion 15. That is, the rim flange portion 14 has a structure protruding radially outward from the outer peripheral surface of the rim base portion 15 in accordance with the larger outer diameter than the rim base portion 15. A lower surface of the radially outward protruding part of the rim flange portion 14 can be contact with the upper surface of the tire bead portion B in a surface contact manner. Thus, the rim flange portion 14 can press the tire bead portion B from above so as to fix the tire T.

In addition, in the lower surface of the rim flange portion 14, a fastening hole 18 open on the lower side is formed in a position corresponding to the aforementioned fastening hole 17 of the rim base portion 15. A female thread portion is formed in the fastening hole 18 so that the coupling member 20 such as a bolt can be screwed down thereto from below.

The body portion 16 is a so-called ring-shaped cylindrical member whose vertical length is shorter than its diameter, in the same manner as the aforementioned rim base portion 15. The body portion 16 is disposed adjacently to the lower side of the rim base portion 15. The upper end side of the body portion 16 has an outer diameter substantially as large as the rim base portion 15. However, the body portion 16 is also formed into a tapered shape whose diameter is reduced as goes toward the lower end, in the same manner as the rim base portion 15. Thus, the diameter on the lower end side of the body portion 16 is smaller than the inner diameter of the tire T, so that the body portion 16 can be inserted into the inner peripheral side of the tire T easily.

That is, the outer diameter on the lower end side of the body portion 16 is smaller than the inner diameter of the tire T. The body portion 16 hardly contacts with the tire bead portion B when the tire T is pressed in. Therefore, much friction is not generated between the body portion 16 and the rim bead portion. Thus, it is not likely that the body portion 16 may be degraded or injured due to friction. Therefore, the aforementioned friction reduction treatment is not performed on the body portion 16.

Further, in the body portion 16, a fastening hole 19 penetrating the body portion 16 vertically is also formed in a position corresponding to the aforementioned fastening hole 17 of the rim base portion 15 and the aforementioned fastening hole 18 of the rim flange portion 14. A female thread portion is formed in the fastening hole 19 so that the coupling member 20 such as a bolt can be screwed down thereto from below.

The coupling member 20 is constituted by a bolt or the like disposed vertically. A male thread portion is formed in the coupling member 20. The coupling member 20 is screwed down to the fastening holes 18, 17 and 19 of the rim flange portion 14, the rim base portion 15 and the body portion 16 so that the three members can be fastened and integrated with one another.

An O-ring 21 is provided in the aforementioned part to be contact with the rim base portion 15 in the bottom surface (lower surface) of the rim flange portion 14. The O-ring 21 prevents leakage of compressed air supplied into the tire T front the space between the rim flange portion 14 and the rim base portion 15 so that the air pressure inside the tire T can be kept good even if the rim for tire testing 10 is divided.

A positioning mechanism is provided in the aforementioned three members, that is, the rim flange portion 14, the rim base portion 15 and the body portion 16. The positioning mechanism puts the rim flange portion 14, the rim base portion 15 and the body portion 16 on one and the same axis. To say other words, the positioning mechanism aligns the rotational axes of the rim flange portion 14, the rim base portion 15 and the body portion 16 with one and the same straight line extending vertically. In a structure (spigot structure) used as the positioning mechanism according to the present embodiment, the three members, that is, the rim flange portion 14, the rim base portion 15 and the body portion 16 are fitted to one another so that the rotational axes of the three members can be aligned with one another.

More specifically, the spigot structure is a structure in which the rim flange portion 14 and the body portion 16 are fitted to the rim base portion 15. That is, the bottom surface of the aforementioned rim flange portion 14 is higher on the central side than on the outer edge side. Thus, the bottom surface of the rim flange portion 14 protrudes downward on the central side. On the other hand, an opening portion 22 is formed on the central side of the rim base portion 15 so as to penetrate the rim base portion 15 vertically. The inner diameter of the opening portion 22 is substantially as large as the outer diameter on the central side of the rim base portion 15 protruding downward. Thus, when the aforementioned central side of the bottom surface of the rim flange portion 14 is inserted into the opening portion 22 of the rim base portion 15 from above, the rim flange portion 14 can be fitted into the rim base portion 15.

On the other hand, the protruding part and the opening portion 22 are formed in positions where the rotational axis of the rim flange portion 14 and the rotational axis of the rim base portion 15 is arranged on a single straight line extending vertically when the central side of the bottom surface of the rim flange portion 14 is inserted into the opening portion 22 of the rim base portion 15. Therefore, when the aforementioned protruding part on the central side of the bottom surface of the rim flange portion 14 is fitted into the opening portion 22 of the rim base portion 15, the rotational axis of the rim flange portion 14 and the rotational axis of the rim base portion 15 are automatically arranged on a single straight line extending vertically.

Such a fitting structure between the rim flange portion 14 and the rim base portion 15 is also provided between the body portion 16 and the rim base portion 15. That is, the upper surface of the body portion 16 is higher on the central side than on the outer edge side. Thus, the upper surface of the body portion 16 protrudes upward on the central side. The outer diameter of the part protruding upward is substantially as large as the inner diameter of the opening portion 22. Thus, when the aforementioned central side of the upper surface of the body portion 16 is inserted into the opening portion 22 of the rim base portion 15 from below, the body portion 16 can be fitted into the rim base portion 15. Further, the protruding part and the opening portion 22 are formed in positions where the rotational axis of the body portion 16 and the rotational axis of the rim base portion 15 is arranged on a single straight line extending vertically when the central side of the upper surface of the body portion 16 is inserted into the opening portion 22 of the rim base portion 15. Therefore, when the aforementioned protruding part on the central side of the upper surface of the body portion 16 is fitted into the opening portion 22 of the rim base portion 15, the rotational axis of the body portion 16 and the rotational axis of the rim base portion 15 are automatically arranged on a single straight line extending vertically.

In the present embodiment, a fitting structure (spigot structure used as the positioning mechanism for aligning the rotational axes of the rim flange portion 14, the rim base portion 15 and the body portion 16. However, another mechanism may be used as the positioning mechanism in the present invention.

Figure 4A:
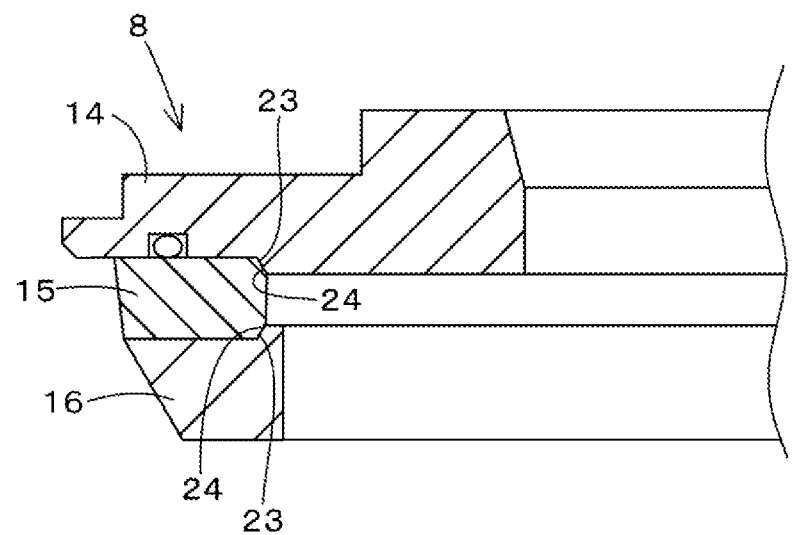
FIG. 4A A sectional view showing a positioning mechanism of the upper rim using taper fitting.

For example, as shown in FIG. 4A, a tapered surface 23 having a vertical thickness reduced as goes radially inward is formed in each of a radial end portion of the upper surface of the rim base portion 15 and a radial end portion of the lower surface of the rim base portion 15. A slope 24 is formed on each of the inner edge side of the lower surface of the rim flange portion 14 and the inner edge side of the upper surface of the body portion 16. The slope 24 is inclined to increase its vertical thickness as goes radially inward. The inclination angle of the slope 24 is made as large as that of the aforementioned tapered surface 23. In this manner, when the three members are fastened using the aforementioned coupling member, the tapered surface 23 and the slope 24 are contact with each other in a surface contact manner, so that the three members can move automatically along the inclination to align the rotational axes of the three members with one another.

Figure 4B:
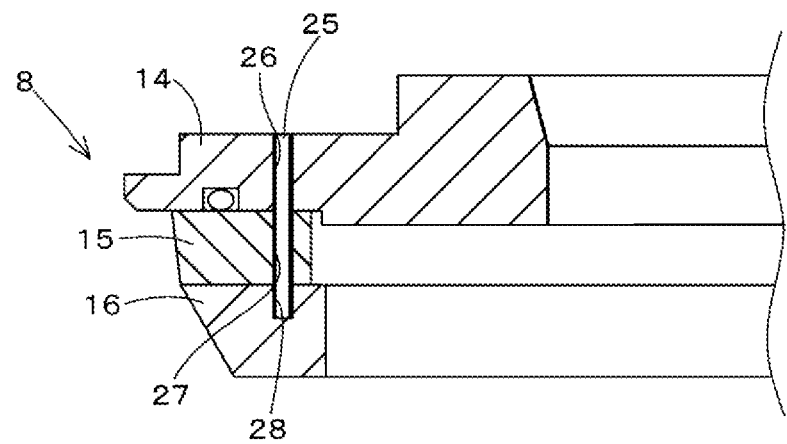
FIG. 4B A sectional view showing a positioning mechanism of the upper rim using a pin.

Alternatively, as shown in FIG. 4B, the three members, that is, the rim flange portion 14, the rim base portion 15 and the body portion 16 may be positioned coaxially by use of a pin 25 which connects the three members vertically.

That is, a first pin insertion hole 26 is formed to penetrate the rim flange portion 14 vertically, a second pin insertion hole 27 is formed to penetrate the rim base portion 15 vertically, and a third pin insertion hole 28 is formed to extend from the upper surface of the body portion 16 to the vertically middle side thereof. The three insertion holes 26, 27 and 28 are formed so that the positions of the holes can be aligned with one another when the rotational axes of the three members are aligned with one another. In this manner, when the three members are positioned horizontally to align the hole positions of the three insertion holes 26, 27 and 28 with one another and the straight-line pin 25 is then inserted into the three insertion holes 26, 27 and 28 to connect the three insertion holes, the three members can be positioned coaxially while increasing centering accuracy in the rim flange portion 14 and body portion 16 to the rim base portion 15.

The positioning mechanisms shown in FIG. 4A and FIG. 4B are merely examples of the mechanisms other than the spigot structure. The three members may be positioned coaxially using mechanism(s) other than those shown in FIG. 4A and FIG. 4B.

FIG. 3A and FIG. 3B show the structure of the lower rim 9 opposed to the aforementioned upper rim 8. The lower rim 9 has a structure obtained by inverting the upper rim 8 vertically.

That is, the lower rim 9 of the rim body 11 can be divided into three members, that is, the rim flange portion 14, the rim base portion 15 and the body portion 16 vertically (in the direction along the rotational axis of the rim body 11) from the lower end side. Of the members arranged thus vertically, the rim base portion 15 is located in a vertically middle position. That is, the rim base portion 15 is a member disposed in a position adjacent to the upper side of the rim flange portion 14 and adjacent to the lower side of the body portion 16.

In addition, the rim base portion 15 of the lower rim 9 is formed into a tapered shape whose diameter is a little smaller on the upper end side than on the lower end side, so that the rim base portion 15 can be inserted into the inner peripheral side of the tire T easily. In addition, the rim flange portion 14 of the lower rim 9 has a structure protruding radially outward from the outer peripheral surface of the rim base portion 15. An upper surface of the radially outward protruding part of the rim flange portion 14 can be contact with the lower surface of the tire bead portion B in a surface contact manner. Thus, the rim flange portion 14 can press the tire bead portion B from below so as to fix the tire T. Further, the body portion 16 is a member disposed adjacently to the lower side of the aforementioned rim base portion 15. The lower end side of the body portion 16 has an outer diameter substantially as large as the rim base portion 15. However, the body portion 16 is formed into a tapered shape whose diameter is reduced toward the upper end thereof, in the same manner as the rim base portion 15. Thus, the upper end side of the body portion 16 is smaller than the inner diameter of the tire T, so that the upper end side of the body portion 16 can be inserted into the inner peripheral side of the tire T easily.

A coupling member 20 such as a bolt for connecting the fastening holes 17, 18 and 19 of the rim flange portion 14, the rim base portion 15 and the body portion 16 with one another is also provided in the aforementioned lower rim 9. The three members, that is, the rim flange portion 14, the rim base portion 15 and the body portion 16 are integrated with one another by use of the coupling member 20. In addition, O-rings 21 are provided at two upper and lower places between the rim flange portion 14 and the rim base portion 15 contacting with each other in a surface contact manner and between the body portion 16 and the rim base portion 15 contacting likewise so as to suppress leakage of the air inside the tire T from the boundaries respectively, in the same manner as the upper rim 8. Of the three members, the outer peripheral surface of the rim base portion 15 is subjected to a friction reduction treatment in the same manner as in the upper rim 8.

The friction reduction treatment is a surface treatment performed on the outer peripheral surface of the rim base portion 15 in each of the upper rim 8 and the lower rim 9. The friction reduction treatment has a function of reducing frictional force to the tire T (tire bead portion B). The friction reduction treatment is formed only in the outer peripheral surface of the aforementioned rim base portion 15. The friction reduction treatment is not formed in the outer peripheral surface of the body portion 16 or the lower surface of the rim flange portion 14. The friction reduction treatment is performed only on the outer peripheral surface of the rim base portion 15 for the following reason.

Figure 5:
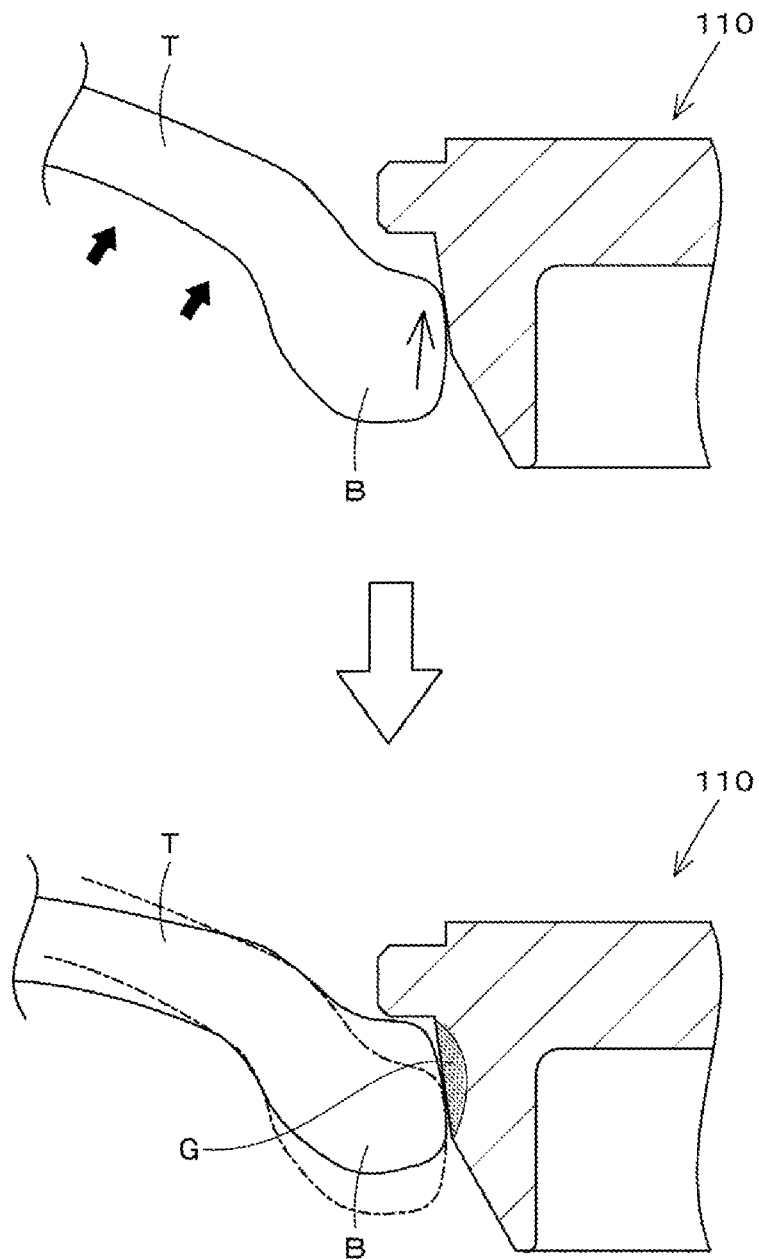
FIG. 5 A sectional view showing a state in which friction occurs in a background-art rim for tire testing.

That is, immediately after the tire T to be tested is attached to a background-art rim for tire testing 110 (before inflation) as shown on the upper side of FIG. 5, the tire bead portion B is fitted up to the tapered side (on the opposite side to the part formed into a flange shape). However, when compressed air is sent into the tire T to be tested in order to inflate the tire T, a force is generated in an inner wall surface of the tire T to inflate the tire T. Receiving the force, the tire bead portion B moves in contact with the upper outer peripheral surface of the tapered part. As a result, in the rim for tire testing after the inflation, a large frictional force is applied to a part G shown in grey in FIG. 5, that is, an outer peripheral surface of a part corresponding to the rim base portion 15 in the present invention.

When the frictional force applied to the outer peripheral surface is large, the tire T to be tested may be insufficiently fitted, or the tire T to be tested may be fitted so that the tire T cannot be removed easily.

Therefore, the friction reduction treatment for reducing the frictional force generated between the rim for tire testing 10 and the tire T to be tested, that is, for reducing a frictional coefficient of the outer peripheral surface of the rim base portion 15 to the tire T to be tested is performed on the rim for tire testing 10 according to the present invention.

More specifically, the friction reduction treatment includes a concave-convex structure that is formed in the outer peripheral surface of the rim base portion 15, and a coating layer with which a surface of the concave-convex structure is coated.

The concave-convex structure is formed by roughing the outer peripheral surface of the rim base portion 15. The concave-convex structure is typically formed by a processing method called "satin treatment". More specifically, the concave-convex structure is formed, for example, by "sandblasting" for spraying iron, sand, glass, etc. on the outer peripheral surface of the rim base portion 15 to rough the surface, or by chemical or electric etching to rough the surface.

In addition, it is preferable that maximum height Ry of the concave-convex structure in accordance with JIS B 0601 (1994) is 10 μm or more. The maximum height Ry is a difference between a highest mountain part and a lowest valley part, in a roughness curve for every reference length. When the concave-convex structure having such a maximum height is formed, that is, when the surface roughness of the outer peripheral surface of the rim base portion 15 is "roughed" to some extent, the frictional force to a tire (rubber) can be reduced.

The coating layer is a coating layer which is formed so that the surface of the aforementioned concave-convex structure can be covered with the coating layer. A material whose frictional coefficient to the tire bead portion B is smaller than that of the rim base portion 15. More specifically, coating using fluororesin or silicone resin, such as Teflon (registered trademark) coating, or coating using diamond-like carbon (DLC) or chromium nitride (Cr—N) is used as the coating layer.

When the aforementioned friction reduction treatment is performed, peeling liquid (for example, peeling liquid containing silicone) for making it easy to attach and remove the tire T can be dispensed with. Thus, the cost required for testing the tire can be suppressed to be low.

In addition, it is sufficient to perform the aforementioned friction reduction treatment on, of the rim for tire testing 10, only the rim base portion 15 where the frictional force becomes large. However, when the friction reduction treatment is performed in the background-art tire testing device 1, the whole of the rim for tire testing 10 must be removed from the testing device. Thus, there is a problem that workability is not good when the friction reduction treatment is performed. On the other hand, in the rim for tire testing 10 according to the present invention, only the rim base portion 15 where the frictional force becomes large can be removed from the rim for tire testing 10. Thus, an effort spent for masking can be dispensed with when the friction reduction treatment is performed. Therefore, the workability in performing the friction reduction treatment is also largely improved.

Particularly the part subjected to the friction reduction treatment is lower in surface hardness than any other part that is not subjected to the treatment. Thus, the part subjected to the friction reduction treatment may deteriorate easily due to abrasion or the like. As a result, the rim for tire testing 10 subjected to the friction reduction treatment must be frequently replaced or reworked. Even when such working of replacement or rework is performed, the whole of the rim does not have to be replaced unlike the case of the background-art rim for tire testing 10. Thus, the workability in the working of replacement or rework can be largely improved, and the working cost can be also largely reduced. Therefore, in the rim for tire testing 10 according to the present invention, the part subjected to the friction reduction treatment can be repaired or replaced easily and at a low cost.

It should be noted that the present embodiments disclosed here do not limit the present invention but are merely exemplary at any point. Particularly, not values that may be departed from their normal ranges performed by those in the art but values that can be estimated easily by those normally skilled in the art are used as items that are not disclosed obviously in the present embodiments disclosed here, for example, running conditions or operating conditions, various parameters, dimensions, weights, volumes, etc. of constituents, etc.

The aforementioned embodiments use an example in which the upper rim 8 and the lower rim 9 are divided vertically (in the direction along the rotational axis of the rim body 11). However, the upper rim 8 and the lower rim 9 may be divided radially. That is, only the rim base portion 15 subjected to the friction reduction treatment may be made removable like a belt so that the part subjected to the friction reduction treatment can be repaired or replaced easily and at a low cost.

The present application is based on a Japanese patent application No. 2015-023278 filed on Feb. 9, 2015, the contents of which are incorporated herein by reference.

DESCRIPTION OF REFERENCE NUMERALS AND SIGNS

1 Tire testing device
2 Frame member
3 Spindle shaft
3U Upper spindle shaft
3D Lower spindle shaft
4 Base portion
5 Support
6 Beam portion
7 Spindle mounting portion
8 Upper rim
9 Lower rim
10 Rim for tire testing
11 Rim body
12 Filling unit
13 Gap
14 Rim flange portion
15 Rim base portion
16 Body portion
17 Fastening hole of rim base portion
18 Fastening hole of rim flange portion
19 Fastening hole of body portion
20 Coupling member
21 O-ring
22 Opening portion
23 Tapered surface
24 Slope
25 Pin
25 First pin insertion hole
27 Second pin insertion hole
28 Third pin insertion hole
T Tire to be tested
B Tire bead portion

The invention claimed is:

1. A rim for tire testing device, comprising a rim body that is rotatably provided in a tire testing device so that a tire to be tested can be attached to the rim body, and a filling unit that fills the tire to be attached to the rim body with a gas at a predetermined pressure, wherein:

the rim body is divided into a rim base portion, a rim flange portion that is disposed on one side of the rim base portion and in the direction along the rotational axis, and a body portion that is disposed on the other side of the rim base portion and in the direction along the rotational axis;

the rim base portion is to be in contact with a tire bead portion of the tire, the rim base portion, the rim flange portion and the body portion are rigidly connected by use of a coupling member so that a relative position of the rim base portion with respect to the rim flange portion and the body portion in a radial direction is fixed; and wherein a positioning mechanism that aligns a rotational axis of the rim base portion with rotational axes of the divided members other than the rim base portion is provided between the rim base portion and the divided members other than the rim base portion.

2. The rim for tire testing according to claim 1, wherein an outer peripheral surface of the rim base portion has been subjected to a friction reduction treatment for reducing a frictional force to the tire.

3. The rim for tire testing according to claim 2, wherein the friction reduction treatment includes a concave-convex structure that is formed in the outer peripheral surface of the rim base portion, and a coating layer with which a surface of the concave-convex structure is coated.

4. The rim for tire testing according to claim 3, wherein a maximum roughness Ry of the concave-convex structure is 10 μm or more.

* * * * *